US005093068A

United States Patent [19]
Schulz

[11] Patent Number: 5,093,068
[45] Date of Patent: Mar. 3, 1992

[54] METHOD OF PRODUCING MULTI-PLY EMBOSSED FIBROUS WEBS

[75] Inventor: Galyn A. Schulz, Appleton, Wis.

[73] Assignee: James River Corporation of Virginia, Richmond, Va.

[21] Appl. No.: 522,734

[22] Filed: May 14, 1990

Related U.S. Application Data

[63] Continuation-in-part of Ser. No. 198,146, May 24, 1988, Pat. No. 4,927,588.

[51] Int. Cl.[5] ........................ B29C 59/04; B32B 31/20
[52] U.S. Cl. .................................... 264/284; 156/152; 156/209; 156/220; 156/324; 162/117; 264/DIG. 57
[58] Field of Search ....................... 264/284, DIG. 57; 162/112, 113, 117; 156/152, 209, 220, 324

[56] References Cited

U.S. PATENT DOCUMENTS

| | | | |
|---|---|---|---|
| 1,964,700 | 6/1934 | Winter et al. | 264/283 |
| 2,043,351 | 6/1936 | Fourness et al. | 264/283 |
| 2,177,490 | 10/1939 | Kieffer | 156/183 |
| 3,684,603 | 8/1972 | Iltio | 156/183 |

*Primary Examiner*—James Lowe
*Attorney, Agent, or Firm*—Richard J. Gallagher; Thomas H. Whaley

[57] ABSTRACT

A method is disclosed for the production of a multi-ply sheet product in which separate non-woven fibrous webs are combined into a multi-ply sheet before embossment, embossed as a multi-ply sheet, embossed webs separated from one another and longitudinally displaced relative to one another, and then recombined into an embossed multi-ply sheet with the embossments out of register with one another. Prior to recombining the webs, the embossments on one of said web is smoothed out increasing the absorbency and softness if the web.

4 Claims, 1 Drawing Sheet

METHOD OF PRODUCING MULTI-PLY EMBOSSED FIBROUS WEBS

CROSS REFERENCE TO RELATED APPLICATION

This application is a continuation-in-part of my co-pending application, Ser. No. 198,146, filed May 24, 1988 now U.S. Pat. No. 4,927,588.

SUMMARY OF THE INVENTION

This invention relates to improvements in the manufacture of multi-ply fibrous sheet structures. In one of its more specific aspects, this invention relates to a method for the production of soft, absorbent multi-ply embossed sheets and to the product produced thereby. In a specific example, a plurality of unembossed non-woven fibrous webs is simultaneously embossed in a single embossing nip; the embossed webs are separated from one another, displaced relative to one another in a longitudinal direction and recombined into a multi-ply sheet of exceptional softness. The method and apparatus of this invention are especially applicable to the production of multi-ply sheet products including toilet tissue and paper towels normally sold in rolls. Embossing the non-fibrous web by the method of this invention results in improvements in absorbency and softness of the product sheets and in a firm, uniform and attractive roll package.

BACKGROUND OF THE INVENTION

It is already known in the art to emboss sheets comprising multiple plies of creped tissue to increase the surface area of the sheets thereby enhancing their bulk and water holding capacity. Paper towels and toilet tissue are usually marketed in rolls containing a specified number of sheets per roll. Paper towels or tissue embossed in conventional patterns of spot embossments, when packaged in roll form, exhibit a tendency to be non-uniform in appearance due to the tendency for ridges to form on the roll along the lines of the bosses as the sheet is wound onto the roll.

Embossment patterns typical of conventional products have a tendency to cause nesting of some of the bosses and stacking of others when the embossed tissue rolled on a hollow core or mandrel. The so-called line patterns, e.g. the pattern illustrated in U.S. Pat. Des. No. 242,579 are especially prone to nesting of the bosses in the product roll whereas dissimilar patterns tend to pile up on top of one another. Since the appearance of a roll of toilet tissue or paper towels is an important attribute suggestive of quality of the product, as well as its softness and absorbency, it is most desirable to avoid resulting non-uniformity of rolls of product, especially those products sold to individual consumers in supermarkets.

It has been proposed heretofore to emboss paper products to avoid nesting of the bosses in rolled, folded, or stacked sheets of paper products by various means including embossing the sheet with bosses of varying configuration, e.g. as in U.S. Pat. Des. No. 230,311 or alternating sheets or strips embossed with one pattern with sheets or strips embossed with another pattern, or alternating embossing patterns on a single strip, e.g. U.S. Pat. No(s). 1,863,973; 2,177,490; and 2,284,663.

Such fibrous sheet products, generally termed non-woven fibrous webs, when produced on a paper making machine are non-uniform in tensile strength, having a greater tensile strength in the machine direction than in the cross-machine direction. When rolled, a strip of the sheet material is wound onto a mandrel or hollow core in the machine direction with perforations in the cross-machine direction to facilitate tearing off sheets from the strip.

Conventionally, rolls of paper toweling and toilet tissue are perforated to produce an approximately square sheet when separated into individual sheets at the perforations.

When the sheets or webs are embossed, the embossment most frequently comprises repetitive parallel rows of identical or alternating boss patterns arranged in the cross-machine direction perpendicular to the machine direction. The boss patterns are also in alignment with one another in the machine direction, with identical bosses appearing either in adjacent cross-machine rows or alternate rows once or twice removed. Alignment of bosses in the machine direction frequently causes "ridging" of the roll product detracting from its appearance. While alternating the patterns of individual bosses reduces the nesting of the bosses in the finished roll products, the expense of the machine embossing roll necessary to produce such patterns of embossment is considerably increased. This invention provides a solution of the above-mentioned problems by providing a method of embossing with identical bosses while avoiding both ridging and nesting of bosses in the rolled product.

By the method of embossment disclosed in U.S. Pat. No. 4,659,608, incorporated herein by reference, it is possible to produce paper toweling and toilet tissue and rolls of product produced therefrom by embossing a pattern of uniformly spaced identical bosses in angular rows on a continuous sheet or strip of non-woven fibrous webs of the towel and tissue type. Embossing in this manner enhances the absorbency and softness of the sheet and results in spiral wound roll package of improved uniformity and appearance.

The method disclosed herein of embossing such fibrous web products avoids many of the problems associated with prior art methods and the products so produced. In one specific preferred embodiment of this invention, the method of embossing fibrous webs disclosed in my issued U.S. Pat. No. 4,659,608 is combined with the method disclosed herein to produce a multi-ply tissue of enhanced bulk, softness and absorbency.

BRIEF DESCRIPTION OF THE DRAWINGS

The invention will be more readily understood with reference to the accompanying drawings wherein.

DESCRIPTION OF THE PREFERRED EMBODIMENT

Figure 1:
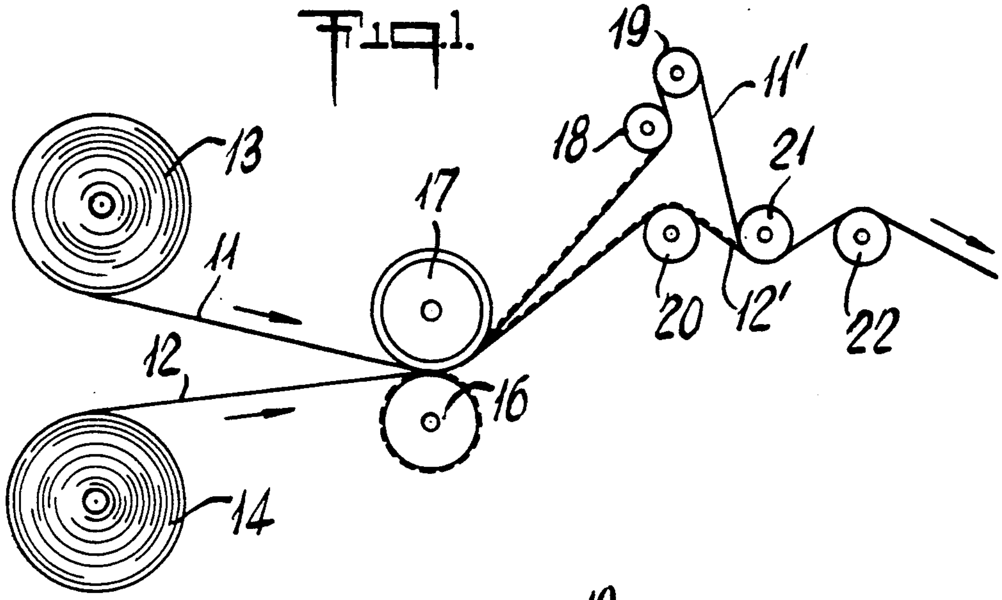
FIG. 1 is a diagrammatic elevational view illustrating the basic elements of apparatus for carrying out the method of this invention.

With reference to FIG. 1 of the drawings, webs or plies 11 and 12 of creped tissue stock suitable for use in multi-ply bathroom tissue products are drawn from supply rolls 13 and 14 and fed into the nip of embossing roll 16 and back up impression roll 17 where the webs are embossed simultaneously. The embossing roll typically has a steel surface provided with a plurality of engraved raised embossing elements. In a specific preferred embodiment, the embossing elements of roll 16 are essentially those disclosed in U.S. Pat. No. 4,659,608 wherein each design is made up of several embossing elements, each of which comprise lands about 0.02 inch wide and about 0.06 inch deep with sides of the lands sloped inwardly from bottom to top at an angle of about 25° relative to the radii of the roll. Each design pattern measures about one inch in its longest dimension. In this preferred embodiment, the patterns are spaced apart about one quarter inch. A resilient back up roll 17 of rubber or similar material permits deep clean embossments in the tissue without rupturing the tissue.

Figure 2:
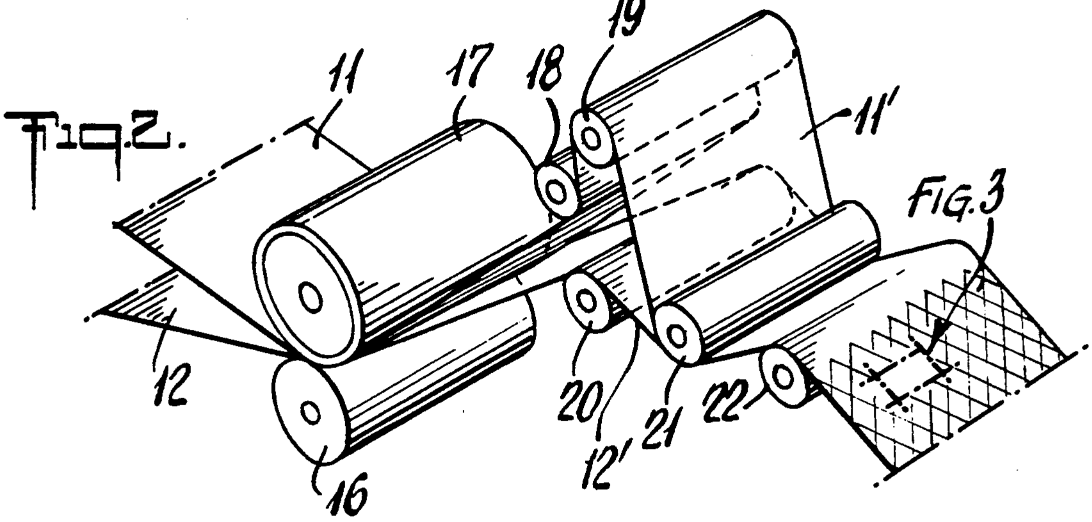
FIG. 2 is a perspective view illustrating operation of the apparatus of FIG. 1.

In the method of this invention, as in the parent application, the plies of the multi-ply embossed sheet formed by the embossing roll 16 and its back up roll 17 are separated from one another after embossing. In the apparatus illustrated in the drawings, embossed web 12', after leaving the embossing roll, is passed directly to the first of the in-feed rolls 20, 21, 22, whereas embossed web 11' passes over rolls 18 and 19 before rejoining web 12' at in-feed roll 21. As illustrated in FIG. 2, rolls 18 and 19 serve not only as a positive means for separation of the embossed webs 11' and 12' but also serve to displace web 11' relative to web 12' in the longitudinal or machine direction and to smooth web 11'. In accordance with this invention, a smoothing roll 18 is provided between the impression roll 17 and in-feed roll 21 where it comes in contact with the raised embossments on web 11' tending to flatten embossed web 11' by smoothing out its embossments. The sheet 11' is held against smoothing roll 18 by displacement roll 19.

Figure 3:
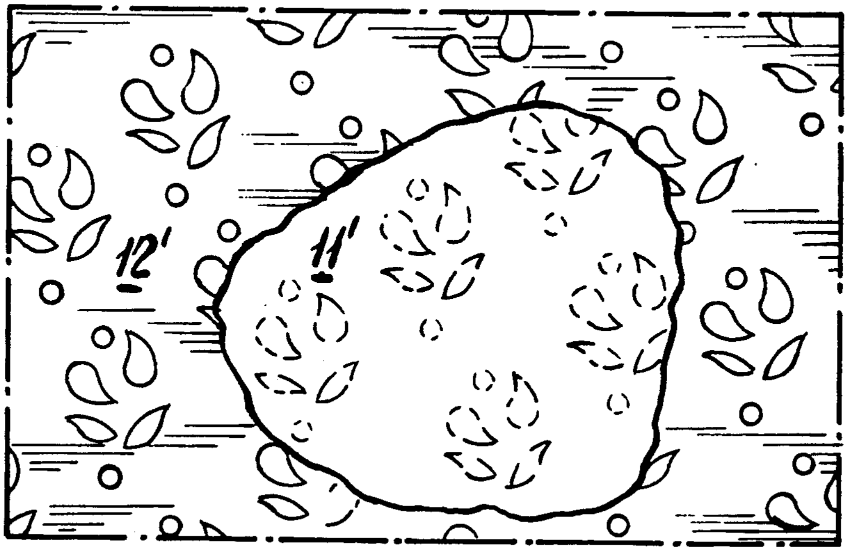
FIG. 3 is a fragmented view of a section of the two ply embossed web of FIGS. 1 and 2.

By displacing the embossed webs relative to one another, the originally nested bosses are so displaced relative to one another as to preclude nesting with one another as illustrated in FIG. 3. The extent to which the web 11' is longitudinally displaced relative to web 12' is determined by the relative lengths of the paths of the webs during their passage from embossing roll 16 to in-feed roll 21. The extent of displacement is easily adjusted to suit the particular embossment pattern by changing the position of the rolls 18 and 19 relative to the path of web 12' to shorten or lengthen the path of web 11' in passing from the embossing roll to the in-feed rolls. The smoothing roll may be placed on either side of the displacement roll relative to the path of the web 11'.

After the embossed webs have been recombined at rolls 21, and 22, the resulting multi-ply product is perforated by conventional perforating rolls (not illustrated).

Typical two-ply bathroom tissue is formed by first joining two webs of creped tissue and then embossing both webs simultaneously. The caliper of the resultant product may be tested on TMI Special Model 551-M motorized micrometer available from Testing Machines Incorporated, Amityville, New York. Eight two-ply sheets are interposed as a stack between parallel, two-inch diameter anvils and subjected to 539±30 grams dead weigh load. Using this test method, two ply bathroom tissue embossed by the method of this invention has a caliper of from about 0.55 to about 0.95 inch which is preferably made essentially the same as or greater than that of two-ply bathroom tissue embossed with the same pattern which is not separated and recombined after it is embossed.

Leveling of the embossments in web 11', which in the finished product is the underside or hidden side of the towel or tissue when rolled on a hollow core, further "works" and softens web 11' increasing its absorbency and softness to the touch.

I claim:

1. In a process for the production of a soft, absorbent multi-ply embossed towel or fibrous tissue product, which comprises forming a multi-ply sheet of unembossed fibrous webs, simultaneously embossing said fibrous webs by passing said multi-ply sheet through the nip of embossing rolls, separating the embossed multi-ply sheet into separate embossed webs, displacing one of said webs of said sheet from another in the machine direction without displacement of the webs in the cross-machine direction by an amount sufficient to prevent mating of embossments, smoothing out the embossments of one of said webs, and recombining said webs into a single multi-ply sheet.

2. A process according to claim 1 wherein the unembossed multi-ply sheet is impressed with bosses of identical size, shape and orientation.

3. A process according to claim 1 wherein the unembossed multi-ply sheet is impressed with bosses arranged in rows skewed at an angle within the range of 15 to 30 degrees with respect to the edge of the sheet in the machine direction.

4. A process according to claim 3 wherein the embossments are spaced in rows across the sheet at an angle within the range of 35 to 50 degrees relative to the cross direction of the sheet.

* * * * *